Dec. 29, 1925.  
K. J. E. HESSELMAN  
1,567,592  
MEANS FOR CONTROLLING VALVES AND THE LIKE BY FLUID PRESSURE  
Filed Oct. 1, 1925
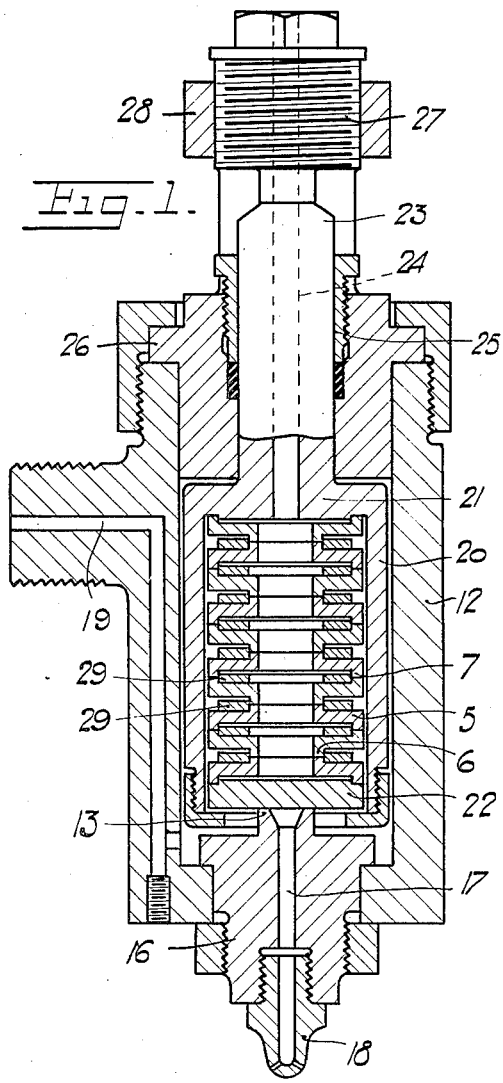
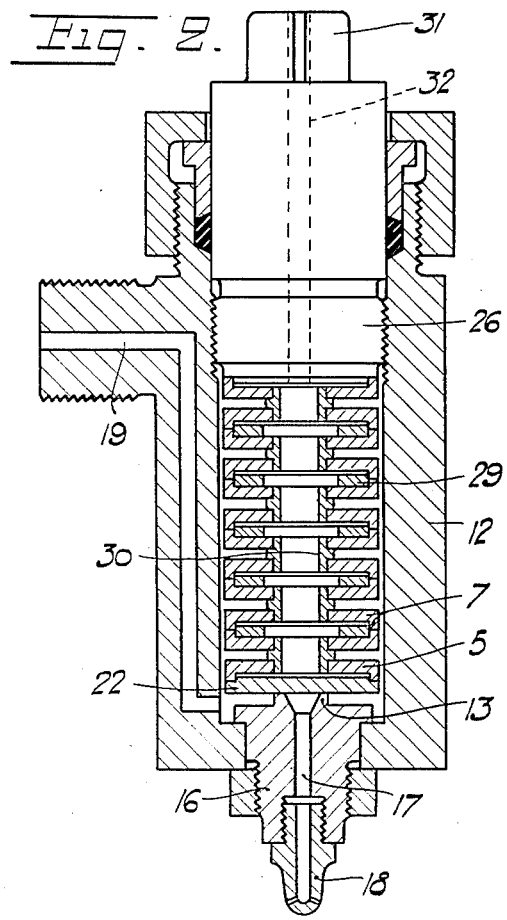
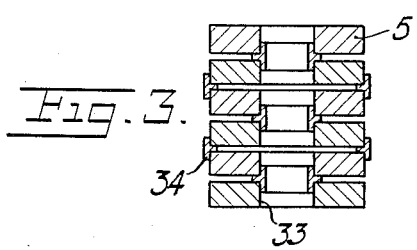
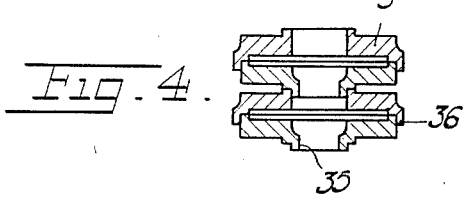

Patented Dec. 29, 1925.

1,567,592

UNITED STATES PATENT OFFICE.

KNUT JONAS ELIAS HESSELMAN, OF SALTSJO-STORANGEN, NEAR STOCKHOLM, SWEDEN.

MEANS FOR CONTROLLING VALVES AND THE LIKE BY FLUID PRESSURE.

Application filed October 1, 1925. Serial No. 59,939.

*To all whom it may concern:*

Be it known that I, KNUT JONAS ELIAS HESSELMAN, a citizen of the Kingdom of Sweden, residing at Saltsjo-Storangen, near Stockholm, Sweden, have invented new and useful Improvements in Means for Controlling Valves and the like by Fluid Pressure, of which the following is a specification.

In my copending patent application Serial No. 733,597, filed August 22, 1924, I have described and claimed a fluid pressure operated valve controlling device comprising a plurality of independent annular flexible disks, contained within a housing to be internally subjected to said fluid pressure, said disks engaging each other loosely to form a hollow column which may contract longitudinally under the action of the fluid pressure to enable a corresponding lift of the valve under control. In order to obtain a reliable action of such a structure it is necessary that the disks are prevented from any lateral movements with respect to each other.

According to the said prior application a through extending internal guiding stem common to all of the disks or a common outer guiding means is provided for this purpose.

The present invention has for its object to avoid the use of such internal or external common guiding means whereby a great advantage is gained, as such means must be manufactured separately for each size of column.

The invention is characterized, chiefly, by the use of separate guiding rings or the like for the individual disks, said guiding rings being adapted to fit closely inside or outside said disks in register with the contact surfaces without affecting the desired elasticity of the body formed by the disks.

In the drawing several embodiments of the invention are illustrated.

Fig. 1 is a longitudinal section of an internal combustion engine fuel valve constructed in accordance with one embodiment of this invention. Fig. 2 is a similar view of a second embodiment. Fig. 3 is a longitudinal section of a number of disks of a third embodiment, and Fig. 4 is a longitudinal section of a number of disks of a fourth embodiment.

With reference to Fig. 1, the numeral 12 indicates the preferably cylindrical housing of the fuel valve. Said housing is closed at its one end by a plug 16 having a through extending fuel outlet passage 17 formed in it, a valve seat 13 being formed at the inner end of said passage while, at the outer end of the passage, the plug carries a fuel nozzle 18. The valve housing 12 is formed with an inlet passage 19 through which the fuel to be controlled by the valve is supplied.

Inserted within the valve housing 12 is a sleeve-shaped carrier 20 supporting a plurality of flexible annular disks 5 having each an elevated rib 6 at the inner periphery of its one side and a similar rib 7 at the outer periphery of its opposite side. Said disks 5 are so positioned with relation to each other, that the inner rib of each disk will loosely engage the inner rib of one adjacent disk, while the outer rib of the disk will loosely engage the outer rib of the other adjacent disk. In this way the disks will together form a hollow column, having alternate inwardly and outwardly opening grooves between the individual disks so as to secure longitudinal flexibility of said column. One end disk bears against the integral top piece 21 of the sleeve 20, and the other end disk rests upon a loosely inserted bottom piece which, in the embodiment shown, comprises a valve plate 22 in engagement with the seat 13. Extending from the top piece 21 is an integral stem 23 through which extends a passage 24 leading from the outer end of the stem to the otherwise closed chamber contained within the column formed by the disks 5 and the end pieces 21 and 22. Said stem 23 extends through a packing 25 placed within the cover 26 of the valve housing 12, and bears with its outer end against a screw 27 engaging a threaded opening formed in a cross piece 28 rigidly connected to the valve housing. The screw 27 is for the purpose of enabling an adjustment of the initial compression of the flexible hollow body, with resulting adjustment of the pressure at which the valve will open.

In each of the grooves formed between the individual disks 5 is loosely inserted a plane ring 29, and each of said rings is closely fitting either inside two adjacent outer ribs 7 or outside two adjacent inner ribs 6, as shown. The height of said rings 29 is somewhat smaller than the height of the respective grooves so as to leave a sufficient space or gap between each ring and the overlying disk to permit the necessary longitudinal compression of the flexible column under the action of the fluid pressure within the housing 12. Owing to the accurate fitting of the rings 29 to the ribs 6 and 7 any lateral movement of the disks 5 with relation to each other will be positively prevented.

The operation of the device in controlling the supply of liquid is quite similar to that described in the specification of my above said prior application.

The embodiment of Fig. 2 comprises, as that above described, a cylindrical valve housing 12 having a fuel inlet passage 19 and a fuel outlet passage 17 of which the latter is formed in a plug 16 inserted in one end of the valve housing, said plug having further a valve seat 13 at the inner end of the fuel outlet passage, and a fuel nozzle 18 at the outer end of said passage. Resting upon the seat 13 is a valve plate 22. The hollow flexible column resting on said plate valve 22 comprises individual disks 5 directly engaging each other only at their outer periphery, as said disks are formed with elevated ribs 7 only at their outer periphery. Said ribs are alternately directed upwardly and downwardly on adjacent disks. Instead of inner ribs, as in Fig. 1, separate space rings 30 are used said space rings at the same time forming inner guiding means for the disks 5. Lateral movements of the disks in relation to each other are also prevented by plane rings 29 inserted into the inner grooves between the disks 5 so as to closely fit to the inner periphery of each two abutting ribs 7. The rings 29 are, as before, of small height in relation to the height of the respective grooves to not affect the flexibility of the hollow body as formed by the disks 5.

In this embodiment there is no supporting sleeve for the valve body. The cover 26 of the valve housing 12 is screw-threaded to engage with corresponding threads formed in the housing 12, and bears directly upon the uppermost disk 5. At its top the cover 26 carries a square head 31 to facilitate rotation, and extending through the cover 26 is a passage 32 corresponding to the passage 23 in Fig. 1.

In Fig. 3 I have shown an embodiment comprising disks 5 plane at both of their sides which are spaced apart and prevented from relative lateral movements by alternate inner and outer space rings 33 and 34, respectively, having each a circumferentially extending angular seat for each of the respective two disks.

In the embodiment of Fig. 4 the disks 5 are formed with integral inner and outer ribs 35 and 36, respectively, designed to engage each other so as to form lateral guiding means for the disks at the same time determining the space between the disks.

It is to be noted that embodiments other than those shown and described may also fall within the scope of this invention. For instance, the disks 5 may only be formed with inner ribs, corresponding to the ribs 6 of Fig. 1, while spaced apart at their outer periphery by space rings, corresponding to the rings 34 of Fig. 3, in which case laterally guiding rings corresponding to the rings 29 are placed in the outwardly opening grooves between the disks 5.

What I claim is:

1. In a fluid pressure operated device for controlling valves, a casing adapted to be internally subjected to the fluid pressure, a set of annular flexible disks adapted to be inserted in said casing so as to loosely engage each other to form a longitudinally flexible, hollow column, an imperforate end piece at one end of said column, an apertured end piece at the opposite end of said column, and means individual to each of said disks to prevent said disks from lateral displacement relatively to each other.

2. In a fluid pressure operated valve controlling device, a casing adapted to be internally subjected to the fluid pressure, a set of annular flexible disks adapted to be inserted in said casing so as to loosely engage each other to form a longitudinally flexible, hollow column, an imperforate end piece at one end of said column, an apertured end piece at the opposite end of said column, and rings individual to each of said disks to prevent said disks from lateral displacement relatively to each other.

3. In a fluid pressure operated valve controlling device, a casing adapted to be internally subjected to the fluid pressure, a set of annular flexible disks adapted to be inserted in said casing so as to loosely engage each other to form a longitudinally flexible, hollow column, an imperforate end piece at one end of said column, an apertured end piece at the opposite end of said column, and separate rings individual to each of said disks to prevent said disks from lateral displacement relatively to each other.

4. In a fluid pressure operated valve controlling device, a casing adapted to be internally subjected to the fluid pressure, a set of annular disks adapted to be inserted into said casing so as to loosely engage each other alternately at their inner and outer periphery, said disks having alternately inner and outer peripheral ribs so as to produce alternately inwardly and outwardly opening grooves between adjacent disks when in assembled state to form a longitudinally flexible, hollow column, an imperforate end piece at one end of said column, an apertured end piece at the opposite end of said column, and rings loosely inserted in said grooves to alternately fit closely inside and outside the ribs to prevent lateral relative movements of adjacent disks, said rings being of a smaller axial length than that of said grooves.

In testimony whereof I have signed my name.

KNUT JONAS ELIAS HESSELMAN.